(12) United States Patent
Williamson

(10) Patent No.: US 11,570,976 B2
(45) Date of Patent: Feb. 7, 2023

(54) ROD HOLDER SYSTEM AND METHOD OF USE

(71) Applicant: Kenneth J. Williamson, Shelby Township, MI (US)

(72) Inventor: Kenneth J. Williamson, Shelby Township, MI (US)

( * ) Notice: Subject to any disclaimer, the term of this patent is extended or adjusted under 35 U.S.C. 154(b) by 257 days.

(21) Appl. No.: 16/718,855

(22) Filed: Dec. 18, 2019

(65) Prior Publication Data

US 2020/0187478 A1 Jun. 18, 2020

Related U.S. Application Data

(60) Provisional application No. 62/781,000, filed on Dec. 18, 2018.

(51) Int. Cl.
*A01K 97/10* (2006.01)

(52) U.S. Cl.
CPC .................................. *A01K 97/10* (2013.01)

(58) Field of Classification Search
CPC ........................................................ A01K 97/10
USPC ........................................................... 43/21.2
See application file for complete search history.

(56) References Cited

U.S. PATENT DOCUMENTS

| | | | | | |
|---|---|---|---|---|---|
| 3,162,409 | A * | 12/1964 | Straayer | .................. | E04H 12/32 248/514 |
| 3,484,066 | A * | 12/1969 | Aunspaugh | ............ | A01K 97/10 248/541 |
| 4,527,349 | A * | 7/1985 | Emory, Jr. | ............. | A01K 97/10 248/513 |
| 4,852,291 | A * | 8/1989 | Mengo | .................... | A01K 97/10 43/21.2 |
| 4,878,642 | A * | 11/1989 | Kirby, Jr. | ................. | A47K 1/08 248/311.2 |
| 5,142,809 | A * | 9/1992 | O'Brien | ................. | A01K 97/10 248/514 |
| 5,163,652 | A | 11/1992 | King | | |
| 5,247,759 | A * | 9/1993 | Noriega | ................. | A01K 97/10 248/279.1 |
| 5,321,904 | A * | 6/1994 | Benson | .................. | A01K 97/10 211/70.8 |
| 5,901,890 | A * | 5/1999 | Stokes | .................... | B63B 21/56 224/406 |
| 6,898,893 | B1 * | 5/2005 | Mukdaprakorn | ...... | A01K 97/10 248/518 |
| 7,309,054 | B2 * | 12/2007 | Slatter | .................... | F16B 2/065 248/521 |

(Continued)

FOREIGN PATENT DOCUMENTS

CA 2635325 12/2009

*Primary Examiner* — Brady W Frazier
*Assistant Examiner* — Zoe Tam Tran
(74) *Attorney, Agent, or Firm* — Law Office of Mark Brown, LLC; Christopher M. DeBacker

(57) ABSTRACT

A rod holder system for use with a boat, specifically for use with a ski bar or other rail element on a boat. The rail can be round or square. The device could even be clamped to a rail of a wooden deck rather than on a boat. A stem is clamped to the rail using a clamp and several clamp screws. A rod holder with a sizing insert is screwed to a top end of the stem using a rod screw for connecting the holder to the stem. The sizing insert can be inserted into the holder and may be interchangeable depending on the rod to be placed within the holder, from a flag pole to a fishing pole handle to a spotlight pole.

14 Claims, 13 Drawing Sheets

(56) References Cited

U.S. PATENT DOCUMENTS

| | | | |
|---|---|---|---|
| 7,448,590 B1 | 11/2008 | Holton | |
| 7,669,361 B2 * | 3/2010 | Baez | A01K 91/08 43/27.4 |
| 8,141,839 B2 * | 3/2012 | Buchner | A63B 55/408 248/516 |
| 8,146,287 B2 * | 4/2012 | Brooks | A01K 97/10 43/21.2 |
| 9,120,536 B2 * | 9/2015 | Isaac | B63B 25/00 |
| 9,161,523 B2 * | 10/2015 | Conry | A01K 97/10 |
| 2003/0230024 A1 * | 12/2003 | Roberson | A01K 97/10 43/21.2 |
| 2005/0102881 A1 * | 5/2005 | Legendziewicz | A01K 97/10 43/21.2 |
| 2020/0093111 A1 * | 3/2020 | Fryar | B63B 34/20 |

\* cited by examiner

ROD HOLDER SYSTEM AND METHOD OF USE

CROSS-REFERENCE TO RELATED APPLICATION

This application claims priority in U.S. Provisional Patent Application No. 62/781,000 Filed Dec. 18, 2018, which is incorporated herein by reference.

BACKGROUND OF THE INVENTION

1. Field of the Invention

The present invention relates generally to a rod holder system and method for use thereof, and more specifically to a rod holder system for holding various elongated rod-like items in and around a boat, or other mountable structures including recreational vehicles, all-terrain vehicles, houses, and decks.

2. Description of the Related Art

Often when boating, boaters require places to place objects, such as flag poles, fishing rods, or other elongated rod-like objects. However, boats do not typically have such elements preinstalled, especially for flag holders. What is needed is a quick and easy system for mounting to a boat for the storage and use of rod-shaped items.

Heretofore there has not been available a system or method for a rod holder system with the advantages and features of the present invention.

BRIEF SUMMARY OF THE INVENTION

The present invention generally provides rod holder system for use with a boat, specifically for use with a ski bar or other rail element on a boat. The rail can be round, square, rectangular, octagonally or hexagonally shaped. The device could even be clamped to a rail of a wooden deck rather than on a boat. A stem is clamped to the rail using a clamp and several clamp screws. A rod holder with a sizing insert is screwed to a top end of the stem using a rod screw for connecting the holder to the stem. The sizing insert can be inserted into the holder and may be interchangeable depending on the rod to be placed within the holder, from a flag pole to a fishing pole handle to a spotlight pole.

When mounting a flag to the rod holder system (or any other rod), the device can help to serve as a reference point for backing a boat up towards a dock or a trailer.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Rod Holder System 2

Figure 1:
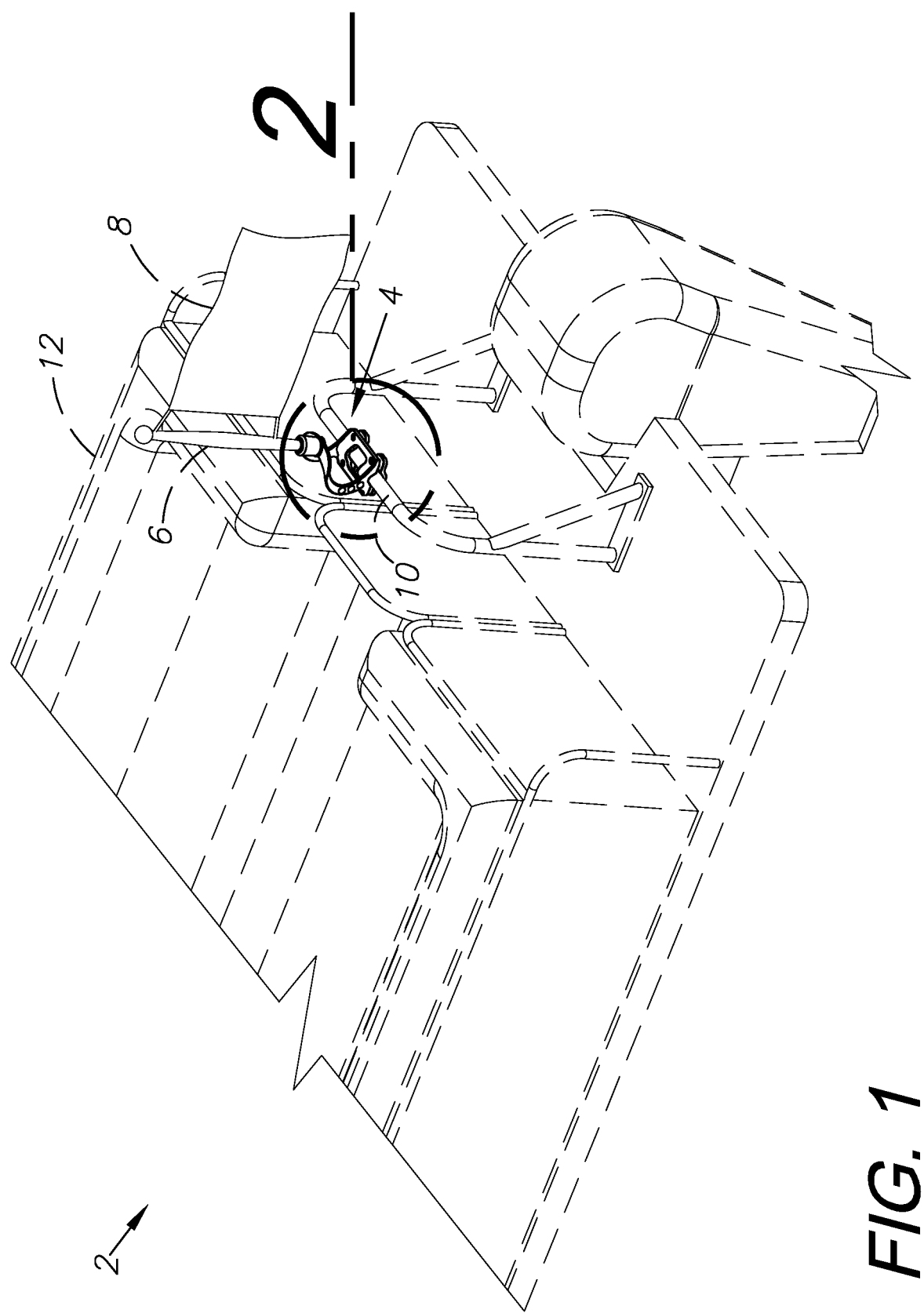
FIG. 1 is a three-dimensional isometric view of a preferred embodiment of the present invention shown in a typical environment attached to a ski bar of a boat.

As shown in the FIGS. 1-8, the present invention is a rod holder system 2 for connecting a rod holder 4 to a rail 10 on a boat 12, such as on a ski bar or other suitable rail surface. The rod holder system 2 could also be mounted to a wooden deck or a square-tubed rail of a pontoon boat. As shown in FIG. 1, a flag pole 6 with a flag 8 can be mounted into the rod holder 4 and will remain fixed in place even if the boat 12 is moving.

Figure 2:
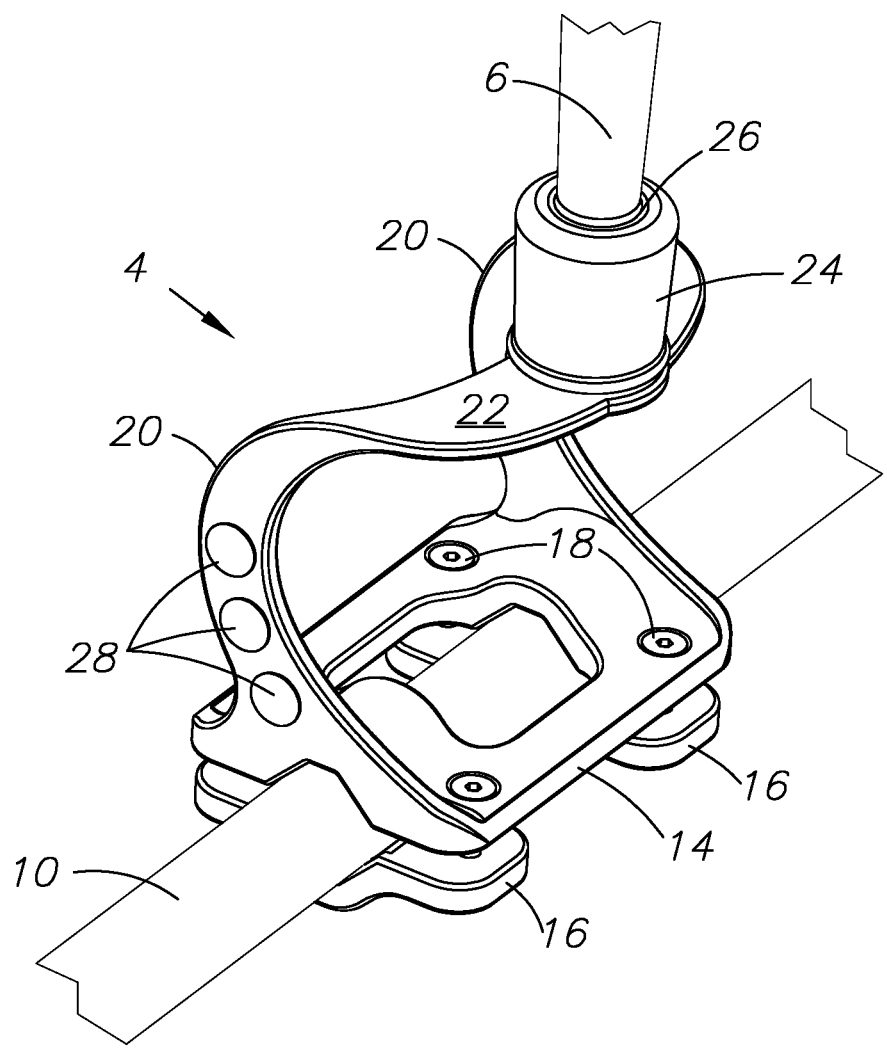
FIG. 2 is a detailed three-dimensional isometric view thereof taken about the circle of FIG. 1.

FIG. 2 shows the rod holder 4 mounted to the rail 10 in more detail. The rod holder 4 is made of a baseplate 14 which clamps over the top of the rail 10 and is held in place by a pair of clamps 16 which are bolted to the baseplate 14 using bolts 18 through bolt holes 29 which may be secured by nuts 30 or may thread directly into the clamps 16. The baseplate 14 turns up into a pair of vertical towers 20 which then transforms into a flat upper platform 22. Removable decorative buttons 28 could be connected to the pair of vertical towers 20. A sizing insert 26 is placed on the upper platform 22 and is secured by a cap 24. The cap and sizing insert secure the flag pole 6 to the rod holder 4.

Figure 3:
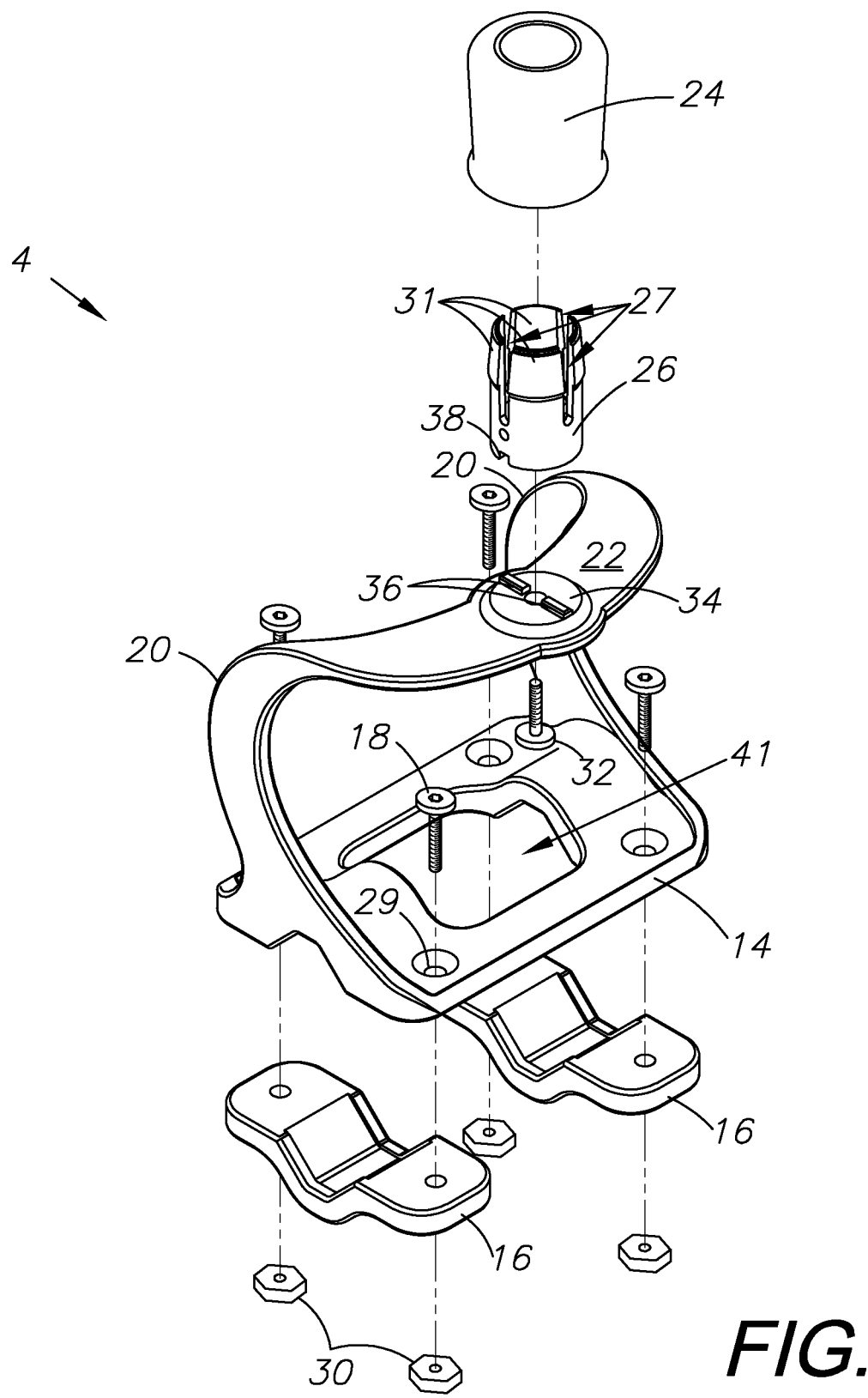
FIG. 3 is an exploded three-dimensional isometric view thereof.

FIG. 3 shows how the insert 26 is secured to the upper platform 22 on a receiver 34 which has a pair of alignment tabs 36 which align with notches 38 on the insert 26. A securing screw 32 secures the cap 24 over the insert 26 and to the upper platform 22. As shown, the insert 26 has several vertical slits 27 separating and thereby forming a number of compression panels 31. These compression panels 31 would allow a rod to be inserted and then would tighten about that rod, gripping it, when the cap 24 is tightened over the insert. Loosening the cap 24 loosens the panels 31 of the insert 26, releasing the rod. Also as shown, a space 41 which allows the rod holder 4 to fit over a knob, hook, or other element commonly included on a ski bar for receiving a ski rope, is located within the base plate 14.

Alternatively to an insert 26, the cap 24 could be formed with multiple tiered receiver sizes for different rod sizes.

Figure 4:
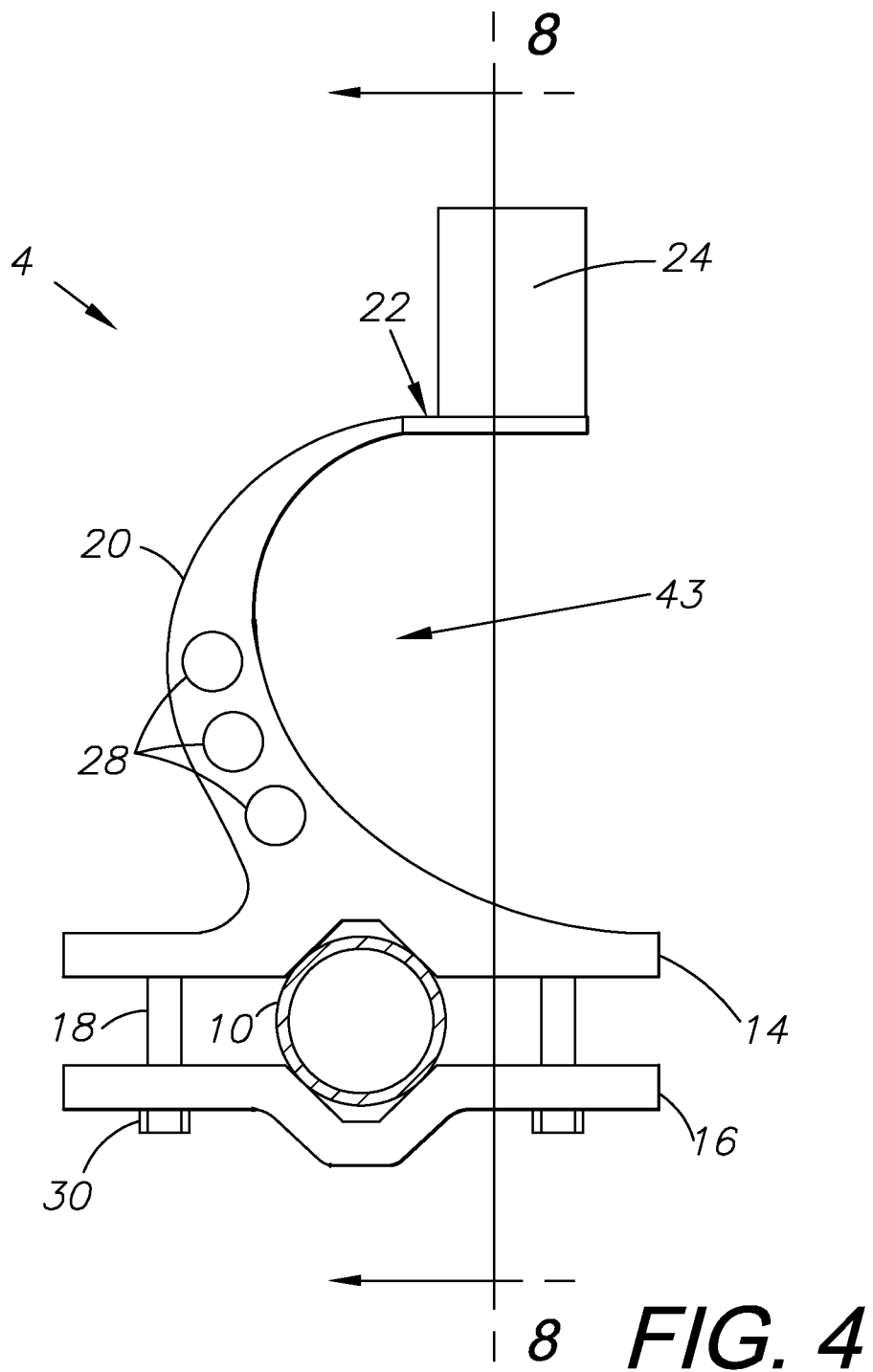
FIG. 4 is a side elevational view thereof.
Figure 4A:
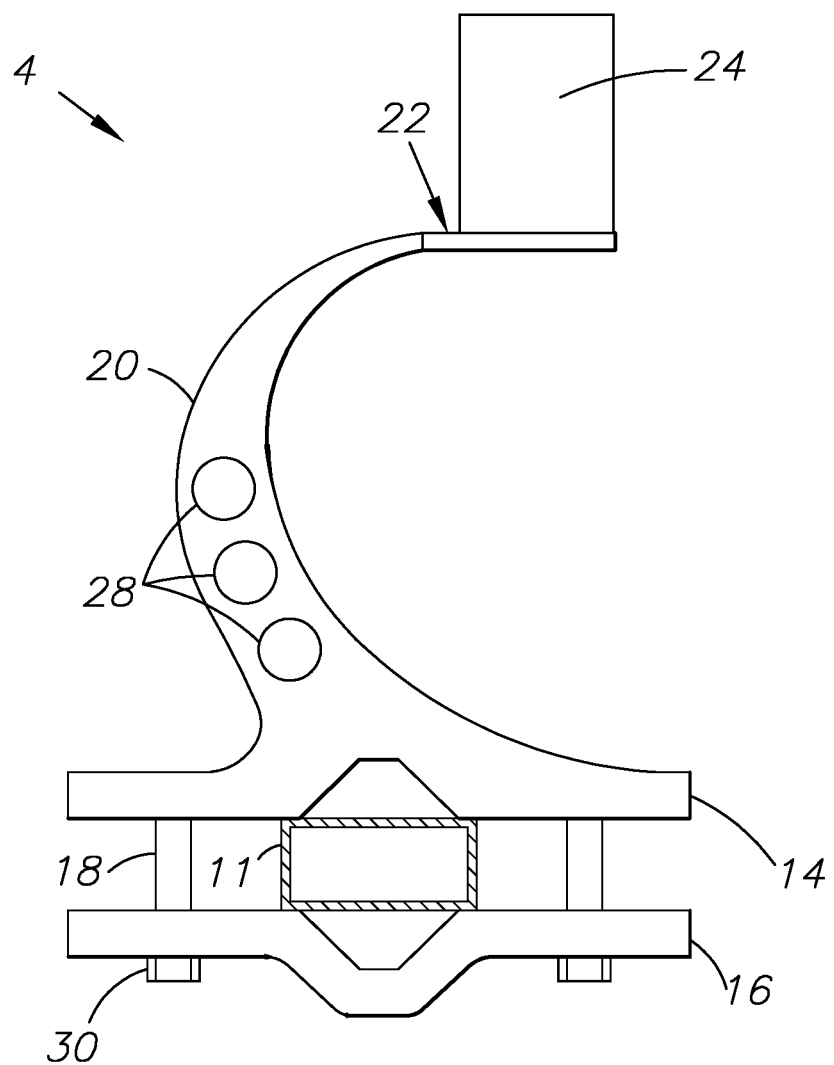
FIG. 4A is a side elevational view thereof with an alternatively shaped rail element.
Figure 4B:
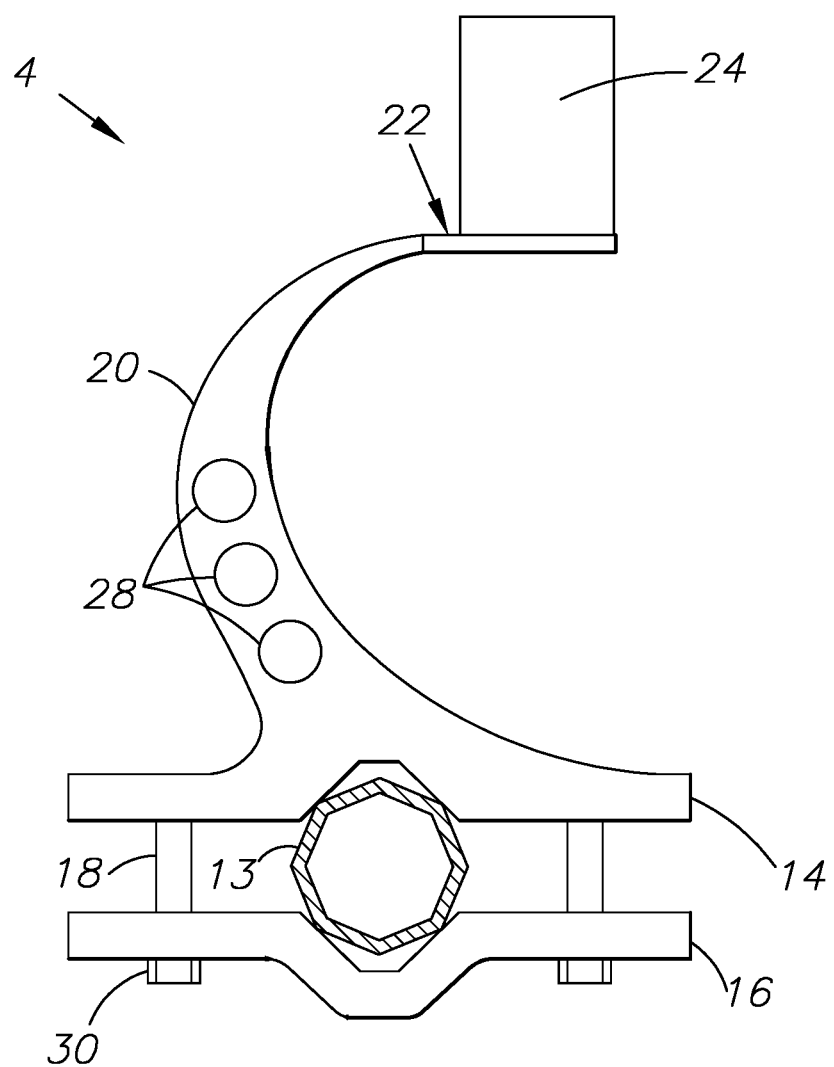
FIG. 4B is a side elevational view thereof with an alternatively shaped rail element.
Figure 5:
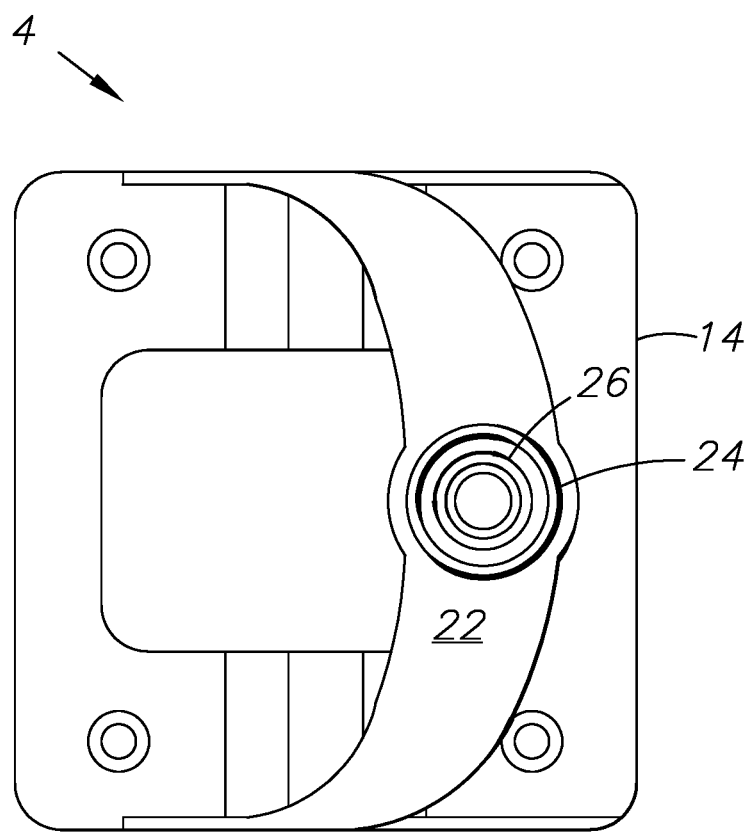
FIG. 5 is a top plan view thereof.
Figure 6:
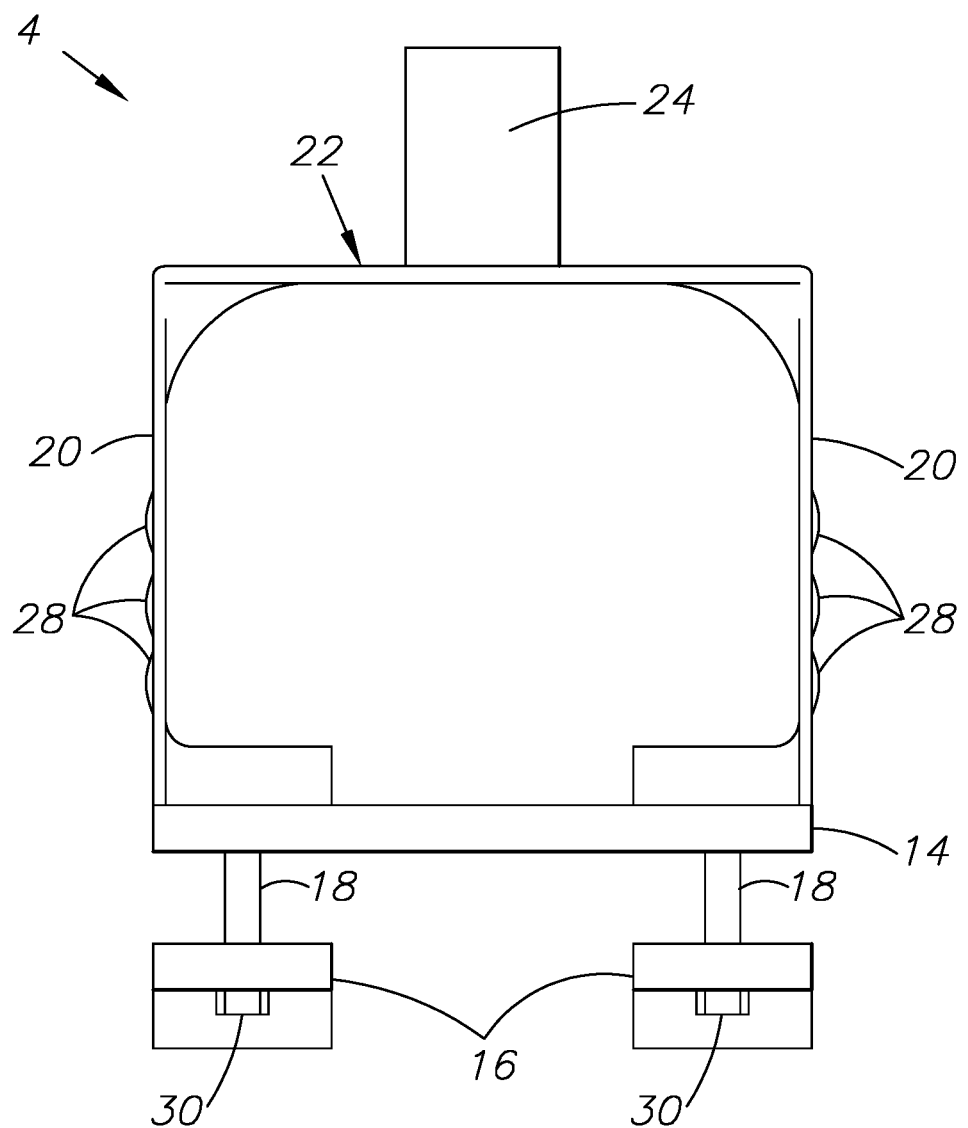
FIG. 6 is a front elevational view thereof.
Figure 7:
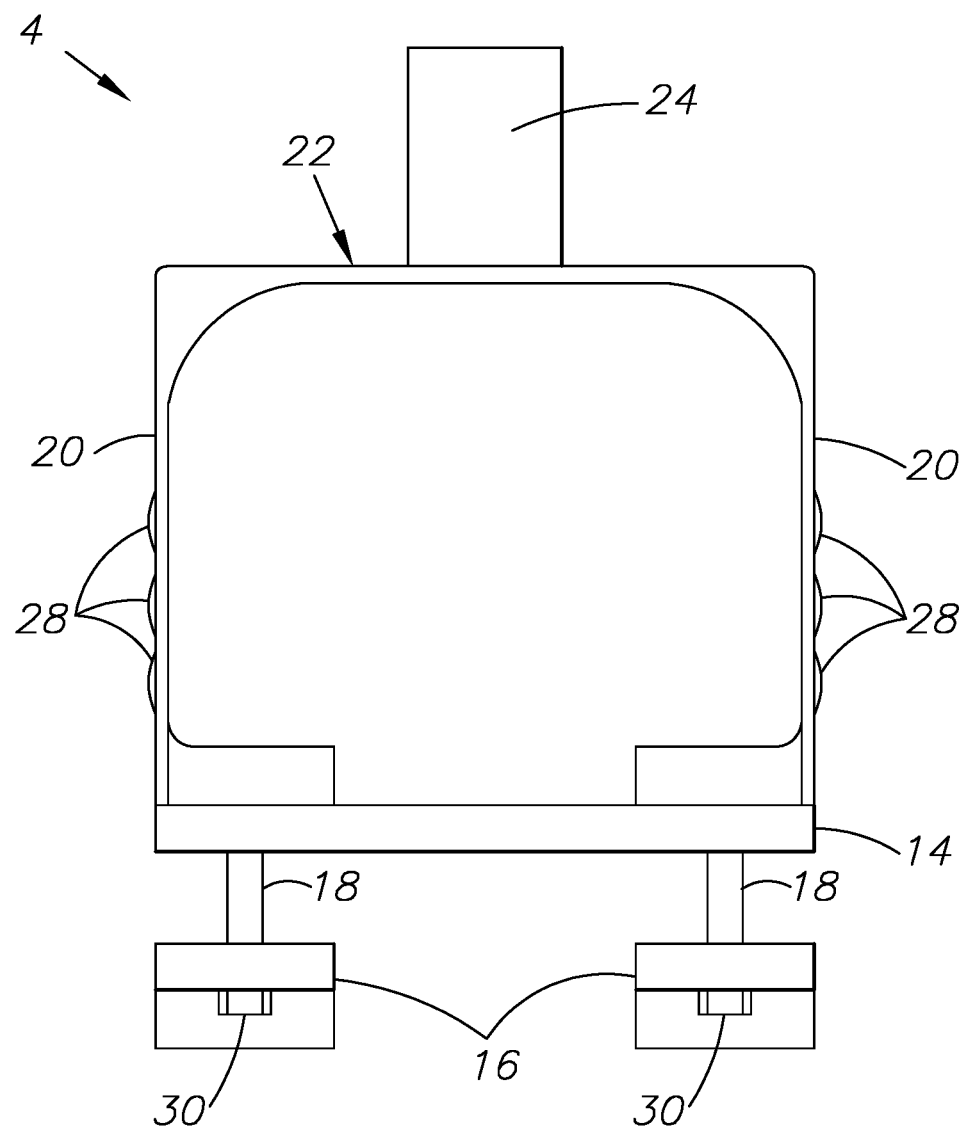
FIG. 7 is a rear elevational view thereof.
Figure 8:
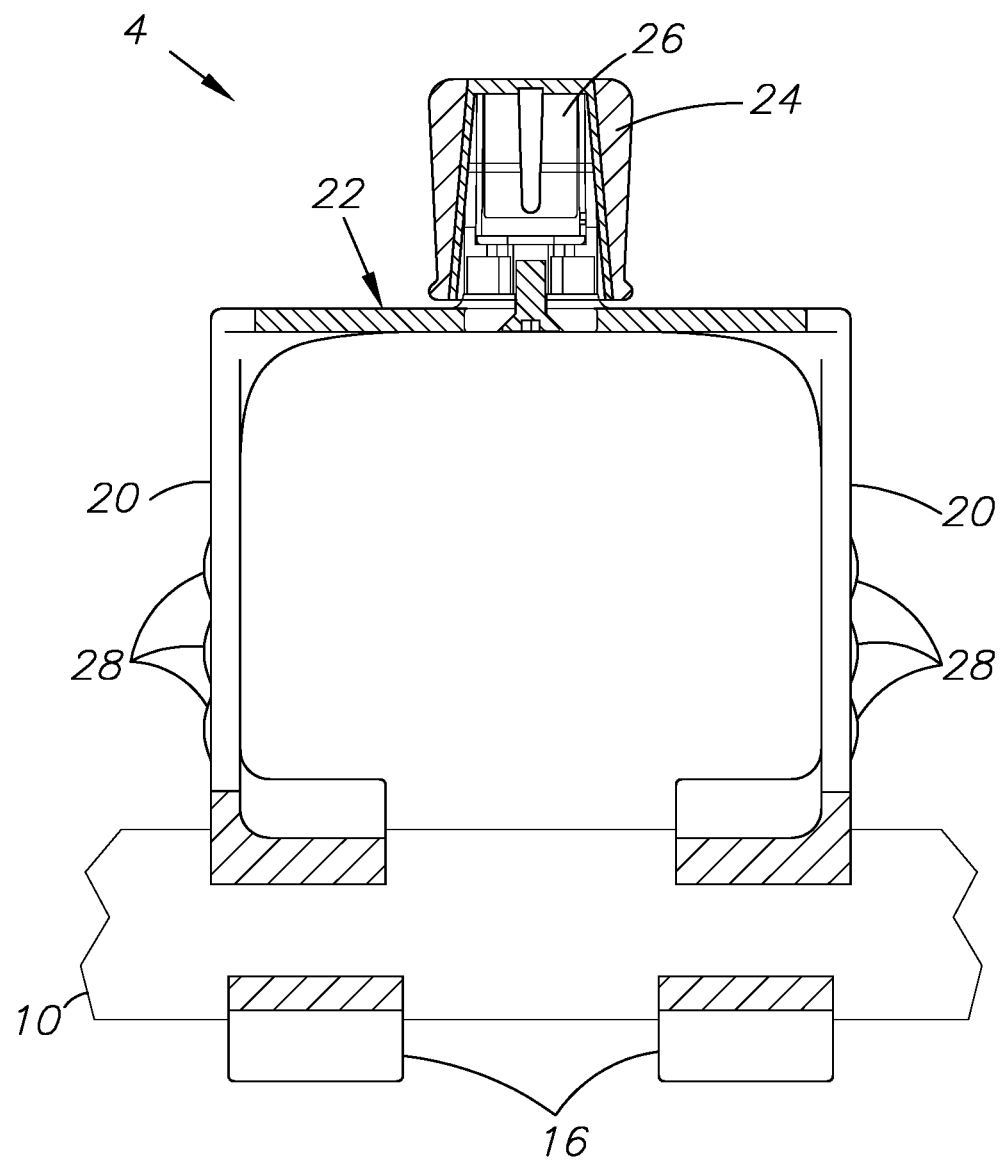
FIG. 8 is a sectional view taken about the line of FIG. 4.

FIG. 4 shows the baseplate 14 and clamp 16 with a circular rail 10. FIG. 4 also shows a space 43 formed by the curved structures of the vertical towers 20 in proximity with the ski bar which commonly holds a tow rope. FIG. 4A shows how the clamp and baseplate can also engage a rectangular shaped rail 11. FIG. 4B shows how a polygonal shaped rail 13 can be engaged. Any shaped rail or structure could be clamped between the baseplate 14 and clamp 16 to mount the rod 6.

III. Alternative Embodiment Rod Holder System 52

Figure 9:
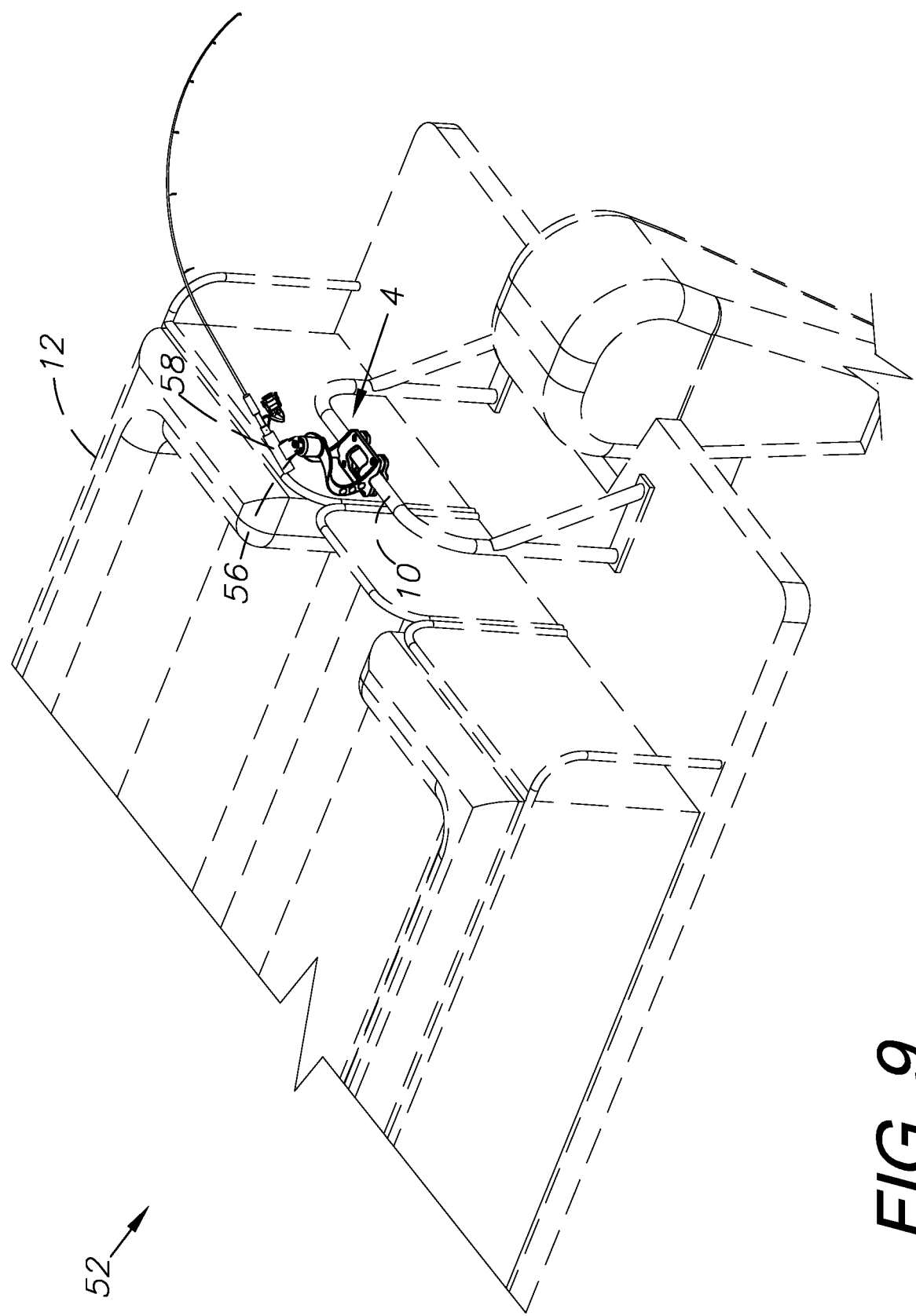
FIG. 9 is a three-dimensional isometric view of an alternative embodiment of the present invention shown in a typical environment and including a fishing rod with a rod mount.

FIG. 9 shows an alternative embodiment rod holder system 52 which uses the same rod holder 4 as above, but where a fishing pole mount 56 holding a fishing pole 58 is inserted into the rod holder 4.

IV. Alternative Embodiment Rod Holder System 102

Figure 10:
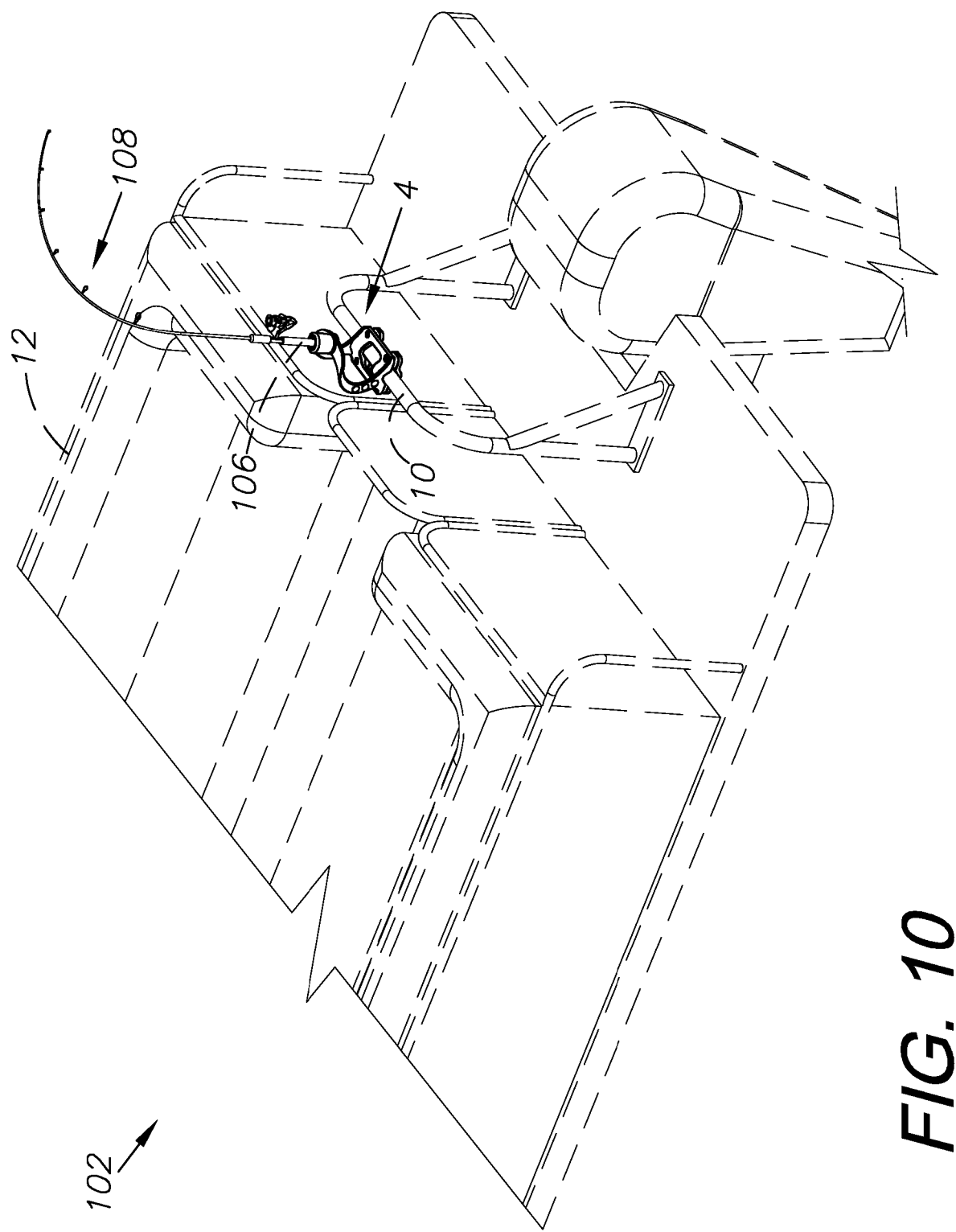
FIG. 10 is a three-dimensional isometric view of an alternative embodiment of the present invention shown in a typical environment and including a fishing rod.

FIG. 10 shows an alternative embodiment rod holder system 102 which uses the same rod holder 4 as above, but where a fishing pole 108 is mounted into the rod holder 4 by the fishing pole handle 106.

V. Alternative Embodiment Rod Holder System 152

Figure 11:
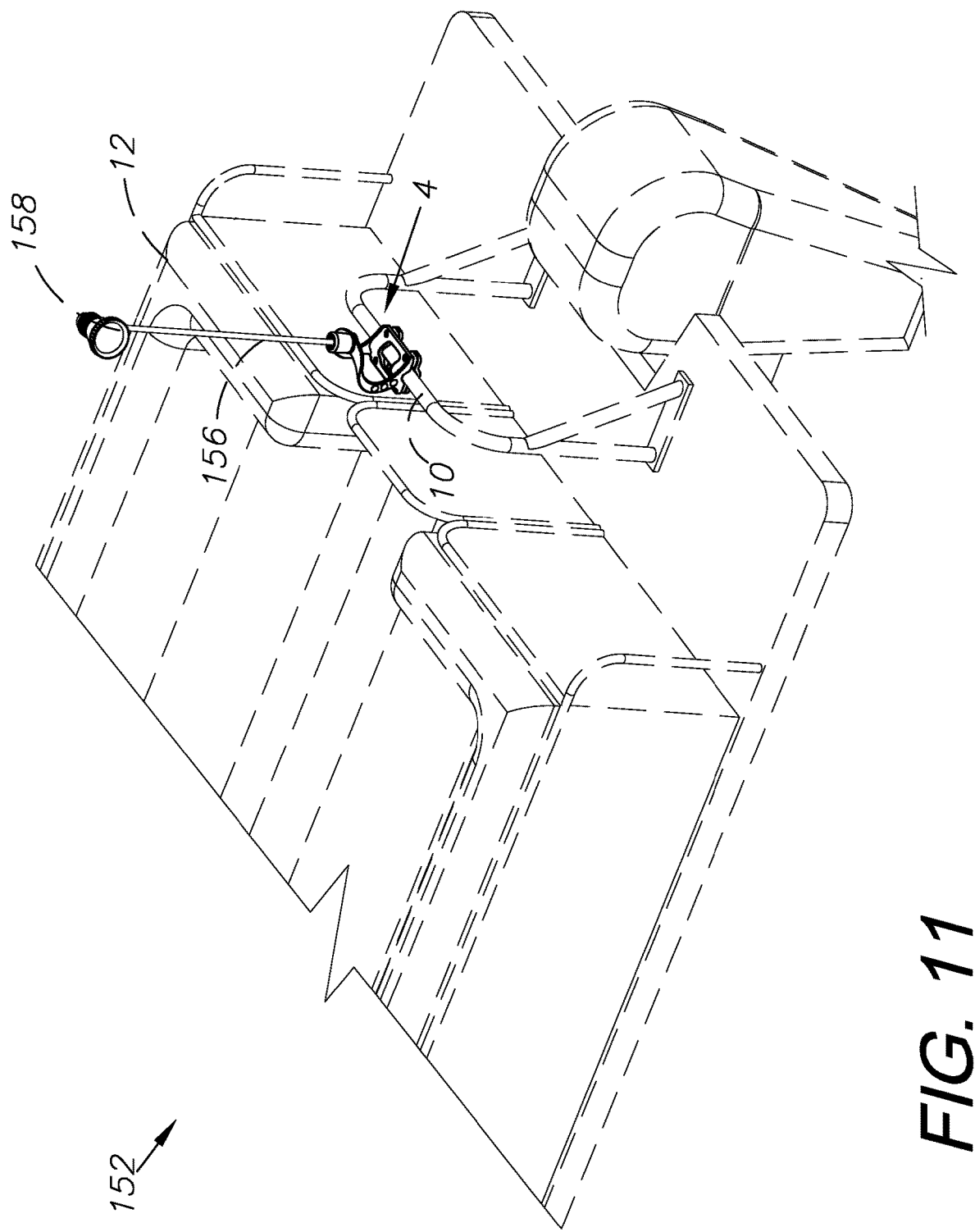
FIG. 11 is a three-dimensional isometric view of an alternative embodiment of the present invention shown in a typical environment and including a spotlight.

FIG. 11 shows an alternative embodiment rod holder system 152 which uses the same rod holder 4 as above, but where a spotlight 158 is mounted into the rod holder 4 by a light pole 156.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A rod holder system comprising:
a rod holder assembly comprising a baseplate, at least one clamp, a removable insert, and a cap;
said baseplate including a pair of vertical towers, each one of said pair of vertical towers curving from said front edge of said baseplate towards said rear edge of said baseplate, and then curving back towards said front edge of said baseplate thereby forming a curved body before terminating into an upper platform, said curved body of said pair of vertical towers creating a space between said baseplate and said upper platform configured for receiving a tow rope;
said at least one clamp secured to said baseplate with at least one securing bolt;
a rod inserted into said cap and said removable insert and secured to said upper platform via said cap and said removable insert, said removable insert configured to clamp down onto said rod;
said removable insert and said cap secured to said upper platform via a securing screw, said removable insert comprising a plurality of vertical slits forming a plurality of compression panels configured to compress around and grip said rod when said cap is tightened about said removable insert;
said baseplate secured to a mountable structure via said at least one clamp and said at least one securing bolt such that said mountable structure is placed between said at least one clamp and said baseplate with said at least one securing bolt locking said baseplate and said at least one clamp about said mountable structure; and
wherein said pair of vertical towers are distinctly separate elements from said at least one securing bolt.

2. The rod holder system of claim 1, further comprising a plurality of decorative buttons removably affixed to each respective one of said pair of vertical towers.

3. The rod holder system of claim 1, wherein said rod comprises a flag pole.

4. The rod holder system of claim 1, wherein said rod comprises a handle of a fishing pole.

5. The rod holder system of claim 1, wherein said rod holder assembly comprises an adjustable fishing pole mount for securing a fishing pole.

6. The rod holder system of claim 1, wherein said rod comprises a light pole topped by a spotlight.

7. The rod holder system of claim 1, wherein said mountable structure comprises a ski bar on a boat.

8. The rod holder system of claim 1, wherein said mountable structure comprises a rail of a boat.

9. The rod holder system of claim 1, wherein said removable insert is configured to be sized based upon a diameter of said rod.

10. A rod holder system comprising:
a rod holder assembly comprising a baseplate, a pair of clamps, a removable insert, and a cap;
said baseplate including a pair of vertical towers, each one of said pair of vertical towers curving from said front edge of said baseplate towards said rear edge of said baseplate, and then curving back towards said front edge of said baseplate thereby forming a curved body before terminating into an upper platform, said curved body of said pair of vertical towers creating a space between said baseplate and said upper platform configured for receiving a tow rope;
each of said pair of clamps secured to said baseplate with at least one securing bolt;
a rod inserted into said cap and said removable insert and secured to said upper platform via said cap and said removable insert, said removable insert configured to clamp down onto said rod;
said baseplate secured to a mountable structure of a boat via said at least pair of clamps and said securing bolts;
wherein said pair of vertical towers are distinctly separate elements from said at least one securing bolt; and
said removable insert and said cap secured to said upper platform via a securing screw, said removable insert comprising a plurality of vertical slits forming a plurality of flex panels configured to flex around and grip said rod when said cap is tightened about said removable insert;

said removable insert comprises a pair of notches configured to align with a pair of vertical alignment tabs located on a receiver of said upper platform.

11. The rod holder system of claim 10, wherein said rod comprises a flag pole.

12. The rod holder system of claim 10, wherein said rod comprises a handle of a fishing pole.

13. The rod holder system of claim 10, wherein said rod holder assembly comprises an adjustable fishing pole mount for securing a fishing pole.

14. The rod holder system of claim 10, wherein said rod comprises a light pole topped by a spotlight.

* * * * *